(No Model.)
2 Sheets—Sheet 1.
M. V. DOYLE.
MACHINE FOR CUTTING WASHERS.
No. 323,860. Patented Aug. 4, 1885.
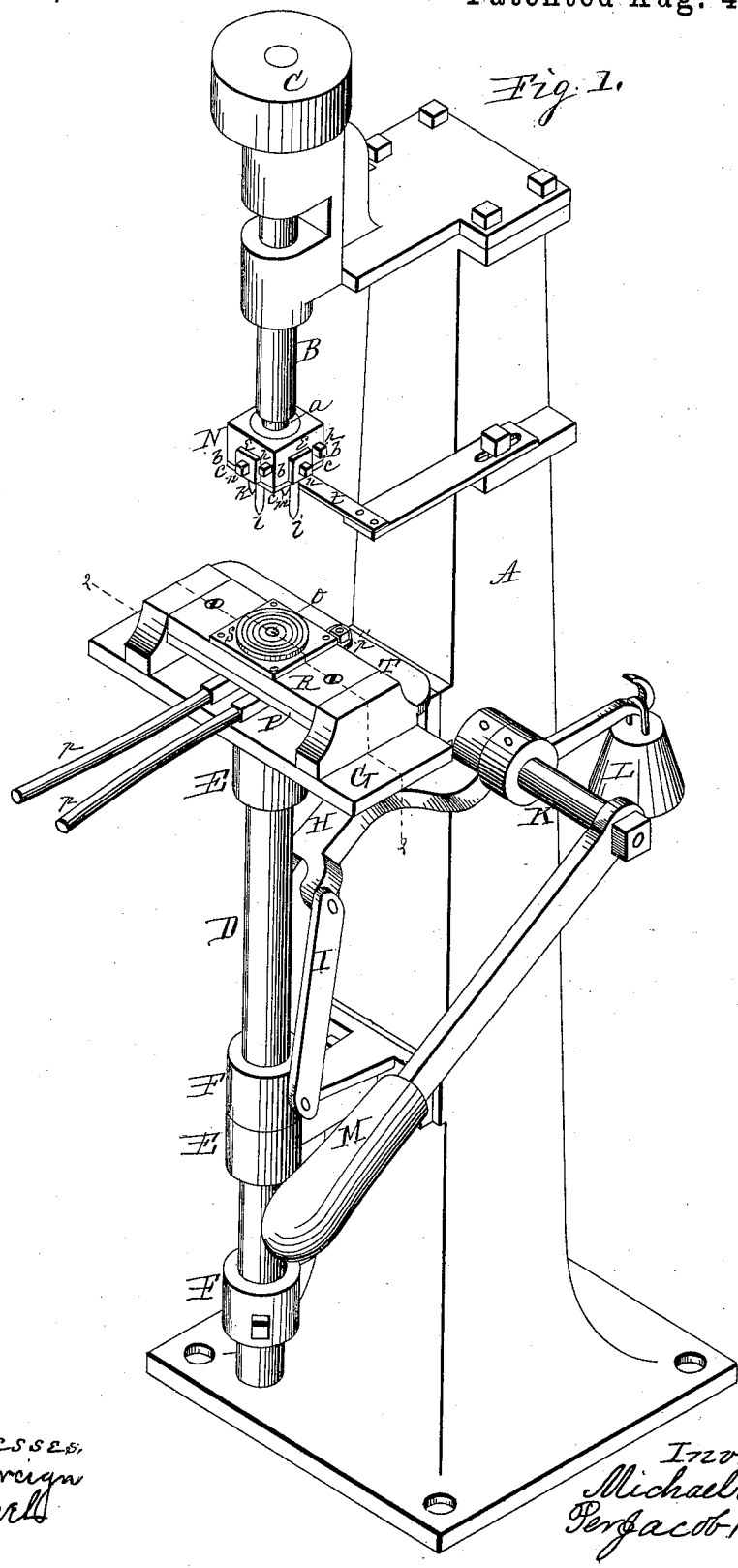
Witnesses,
C. C. Sovereign
A. O. Behel
Inventor.
Michael V. Doyle
Per Jacob Behel
Atty.

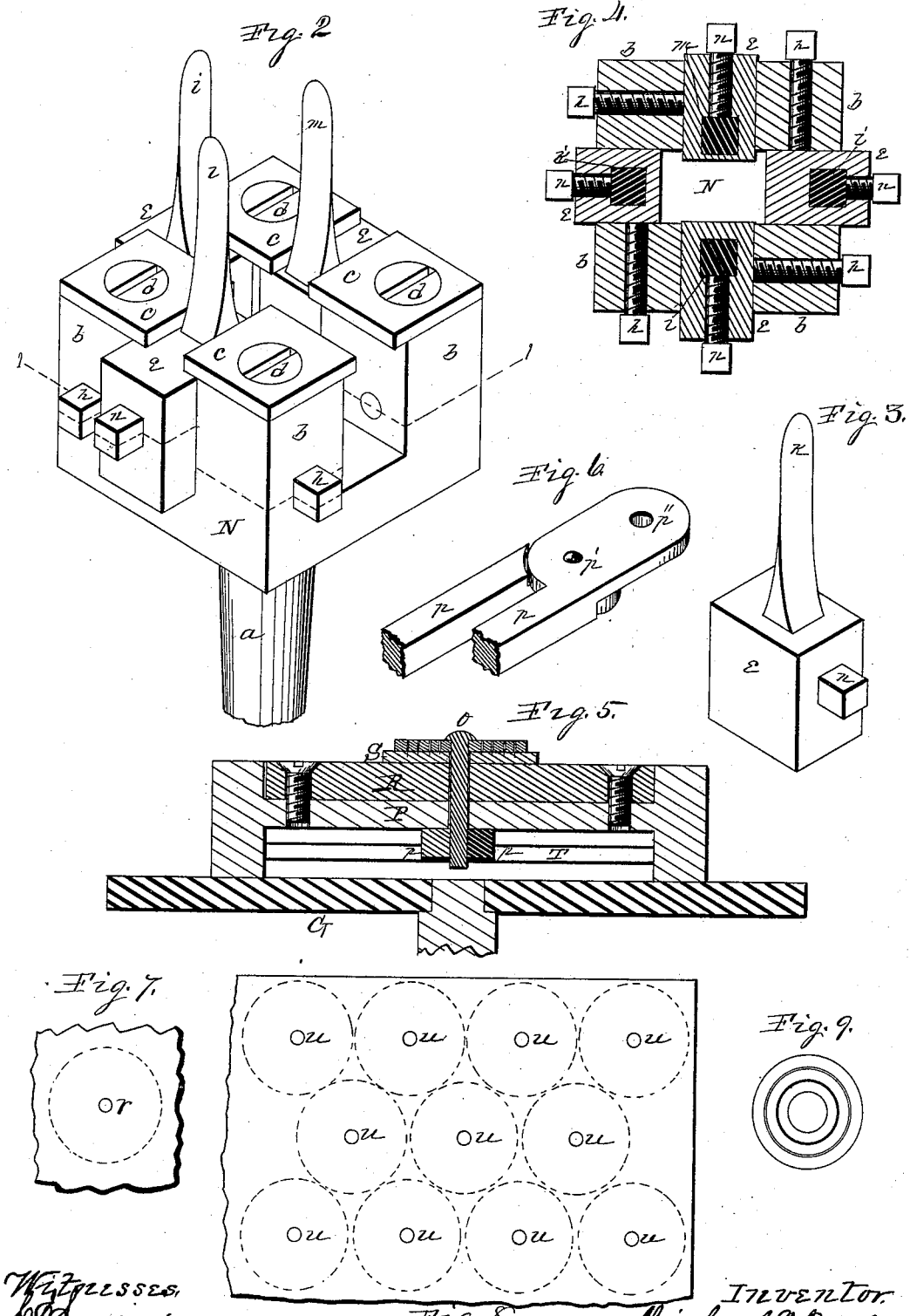

UNITED STATES PATENT OFFICE.

MICHAEL V. DOYLE, OF ROCKFORD, ILLINOIS, ASSIGNOR OF ONE-HALF TO CLARENCE E. SOVEREIGN, OF SAME PLACE.

MACHINE FOR CUTTING WASHERS.

SPECIFICATION forming part of Letters Patent No. 323,860, dated August 4, 1885.

Application filed February 25, 1885. (No model).

*To all whom it may concern:*

Be it known that I, MICHAEL V. DOYLE, a citizen of the United States, residing in the city of Rockford, in the county of Winnebago and State of Illinois, have invented a new and useful Machine for Cutting Washers, of which the following is a specification.

This invention relates to machines for cutting leather washers. Its object is to cut a nest of washers at a single operation from a single piece, but more especially in the manufacture of washers to utilize cuttings of leather which have heretofore, to a great extent, been considered waste; and, further, to produce a machine capable of adjustment to cut washers of the various sizes required to more fully utilize the cuttings with the least practical waste. To this end I have designed and constructed the apparatus represented in the accompanying drawings, in which—

Figure 1 is an isometrical representation of a machine embodying my invention. Fig. 2 is an isometrical under face representation of my improved cutter-head from which one of the cutters is removed. Fig. 3 is an isometrical representation of the cutter removed from the cutter-head. Fig. 4 is a transverse section of the cutter-head on dotted line 1 on Fig. 2. Fig. 5 is a vertical section on dotted line 2 on Fig. 1. Fig. 6 is an isometrical representation of hinge-jointed end portion of the holding-levers. Fig. 7 is a representation of a cutting from which to produce washers. Fig. 8 represents a piece of leather prepared to cut washers from, and Fig. 9 represents a nest of finished washers.

In my improved cutting apparatus the column A, with spindle B and pulley C, mounted to revolve in bearings on the column, the vertical shaft D, its guide-supports E, limiting collars F, table G, and its raising and lowering mechanism consisting of the lever-arm H, connecting-links I, shaft K, counter-weight L, and operating hand-lever M, to raise and lower the table G, are substantially such as have heretofore been used in drilling-machines, and are therefore not new, but are found to be a suitable and convenient arrangement of parts for operating my improved machinery in the manufacture of washers. A cutter-head, N, in this instance of cubular outline, is fitted on one side centrally with a taper-shank, *a*, to enter an axial taper-socket formed for its reception in the lower end of the spindle B. The under face of the cutter-head N is provided with transverse grooves at right angles radiating from the axial center of the head or crossing in the axial center thereof. The under face ends of the corner portions *b* of the head, or the portions thereof standing between the grooves formed in its face, are fitted with cap-plates *c*, fixed in place thereon by means of suitable screws, *d*, passed through the plates and screw-threaded into the head. The inner edges of the cap-plates *c* project slightly over the inner edges of their supports. Blocks *e* are fitted to the radial grooves *b* to slide therein snugly, for the purpose of adjustment, and when in their adjusted position are fixed by means of set-screws *h* screw-threaded into the portions *b* of the head between the grooves, and in position therein to engage the sides of the blocks. The slide-blocks *e* are provided with openings in the direction of the axial center of the head to receive the shank portion of the cutter-blades. The shank end of the cutter-blades *i*, *k*, *l*, and *m* are fitted to enter the openings in the slide-blocks *e*, and set-screws *n* are screw-threaded into the outer edge thereof, to engage the shank of the cutters to fix them in position when adjusted. The outer portions of the cutters are produced in knife form, preferably with rounded lance-formed points. The construction of the cutter-head admits of the adjustment of the cutters laterally or radially to cut washers varying in diameter and in the width of the annular rim thereof. It also admits of the adjustment of the cutters in the direction of their length, to even their outer cutting points or to regulate their relative cutting depth. It further admits the removal of the cutters for refitting when from use or accident they become unfit for use. A supplemental table, P, is mounted on the table G, elevated on end supports fixed to the table, and a wood tablet, R, is fixed to the upper face of the supplemental table; and on the upper face of the wood tablet a rubber tablet, S, is fixed. These several parts, consisting of the rubber tablet S, wood tablet R, and supplemental tablet P, are bored vertically to coincide with the axial center of the spindle B in a manner to receive a holding-pin, o, passed down through the parts. A holding-lever, consisting of arms p, having a hinged connection at p', to permit an opening and closing movement of the arms, form clamping jaws. The hinged end portion of this holding-lever is pivotally connected at p'' to a bar, T, connecting the end supports of the supplemental table, and in such position thereon that the arms p will receive the holding-pin between them in such a manner as to grasp and hold the pin when the free ends of the arms p are grasped and pressed together.

The leather from which to cut washers (if cuttings as shown at Fig. 7) is first perforated centrally, as at r, to receive the holding-pin, and is then placed centrally on the rubber tablet. The holding-pin is then passed into position through the leather and through the several parts composing the supplemental table, and its depending end is grasped by the holding-lever, and a downward pressure on the free ends will operate to hold the leather firmly on the supplemental table. The table, by means of the hand-lever and its connection therewith, is then raised to bring the leather in contact with the cutters of the cutting-head, which, when rotated by belt or other connection with a prime mover, will cut the leather into annular ring washers, as represented at Figs. 1, 5, and 9.

In the operation of cutting washers from cuttings it is desirable that the cutting is completed from the outer cut inward in the order in which the cutters are placed, and for this purpose the outer cutter is adjusted to cut to the greatest depth, and each cutter from the outer cutter inward in their order is adjusted to cut to a less depth than the next outer cutter. In this order of adjustment of the cutters the holding-pin serves to hold the cutting until all the washers in the nest are separated.

For the purpose of preventing the outer cuttings from being thrown by the rotary head when cut through, I have employed a spring, t, made adjustable to engage the cutting outside of the cutters when the head is raised and hold them by pressure against the rubber tablet. After the cutting has been completed the table is lowered. The washers and the holding-pin are then removed from the table, when the machine is ready for another operation.

When it is required to cut washers from larger pieces, or from whole leather, the piece or sheet is first perforated in a suitable manner by punching or drilling, or otherwise, substantially as at u in Fig. 8, and, instead of the headed holding-pin o, a suitable pointed pin is placed in the central opening, resting at its lower end on the table G, having its upper pointed end rising above the supplemental table to enter the perforations u in the sheet, to give it position on the table to receive the cutters.

In the use of my improved cutter-head in cutting washers from larger pieces or whole sheets the order of the working depth of the cutters is reversed from that hereinbefore described, and are adjusted in such a manner that the inner cutter shall work to the greatest depth, and each next outer cutter to a less depth than the next inner cutter.

The construction of my improved cutter-head is such that the cutters are located at opposite sides of its center, and that no two cutters are on the same side, and are capable of various adjustments relatively with each other; but for the purpose of cutting washers in nests at a single operation I prefer to adjust them in the order hereinbefore stated, and the location of the cutters at opposite sides of the center permits the washers to yield at the point of cutting to prevent cramping or binding the cutter-blades. In this instance I have employed vulcanized rubber as a support on which to cut the washers, for the reason that its elasticity prevents the cutters forming grooves in its supporting-surface and enables me to produce washers with a less burr on their under face; but I do not wish to confine myself to the rubber tablet, as other elastic substances may be employed; or, instead thereof, leather or suitable woods, either on side or end, may be employed.

I claim as my invention—

1. In a leather-cutting machine, the combination, with a rotary cutter-head provided with grooves radial with relation to the axis of rotation of said cutter-head, of cutter-holders in said grooves, vertically-adjustable cutters in said holders, and means, substantially as described, for fixing said cutters in adjusted position, as set forth.

2. In a leather-cutting machine, the combination, with a rotary cutter-head provided with grooves made in lines crossing each other and radial with relation to the axis of rotation of said cutter-head, cutter-holders adjustable in said grooves, and means, substantially as described, for fixing said cutter-holders in adjusted position in said grooves, as set forth.

3. In a leather-cutting machine, the combination, with a rotatable cutter-head provided with grooves radial with relation to the axis of rotation of said cutter-head, of an adjustable cutter-holder, and means, substantially as described, for fixing said holder in adjusted position, and an adjustable knife or cutter in said holder, as set forth.

4. In a leather-cutting machine, the combination, with the cutting and operating mechanism, of a main table, and a work-supporting tablet supported above said main table to leave an open space beneath the tablet to permit the use of the grasping mechanism for the work-holding pin, as set forth.

5. In a leather-cutting machine, the combination, with the cutter and operating mechanism, of the work-supporting tablet supported on the main table substantially as described, and a holding-pin and grasping mechanism to hold said pin, as and for the purpose set forth.

6. The combination, with the standard of the machine, and with the work-supporting tablet, and suitable mechanism for elevating the same, of a spring supported from the standard and adapted to bear upon the work to prevent accidental displacement, substantially as set forth.

7. In a leather-cutting machine having a vertically-movable work supporting table, the combination, with the standard thereof, of a spring-arm adjustably connected with said standard, and adapted to bear upon the work when the table is elevated, substantially as set forth.

MICHAEL V. DOYLE.

Witnesses:
C. E. SOVEREIGN,
A. O. BEHEL.